US008302847B2

(12) United States Patent
Johnson et al.

(10) Patent No.: US 8,302,847 B2
(45) Date of Patent: Nov. 6, 2012

(54) RFID PARKING TAG AND METHOD OF MONITORING VEHICLE PARKING

(75) Inventors: Randall E. Johnson, White Lake, MI (US); Daniel J. Selke, Ramsey, NJ (US)

(73) Assignee: RFautomotiveID, LLC., Ramsey, NJ (US)

( * ) Notice: Subject to any disclaimer, the term of this patent is extended or adjusted under 35 U.S.C. 154(b) by 1118 days.

(21) Appl. No.: 11/828,743

(22) Filed: Jul. 26, 2007

(65) Prior Publication Data

US 2009/0026254 A1 Jan. 29, 2009

(51) Int. Cl.
*G06F 17/00* (2006.01)

(52) U.S. Cl. ........................................ 235/375; 235/384

(58) Field of Classification Search .................. 235/375, 235/384, 492

See application file for complete search history.

(56) References Cited

U.S. PATENT DOCUMENTS 6,982,653 B2 1/2006 Voeller et al.
7,026,954 B2 4/2006 Slemmer et al.
7,029,167 B1 4/2006 Mitschele
7,330,131 B2 * 2/2008 Zanotti et al. .............. 340/932.2
2004/0227616 A1 11/2004 Lafferty
2005/0190076 A1 9/2005 Howard et al.
2005/0218214 A1 10/2005 Gravelle et al.
2005/0280555 A1 12/2005 Warner, IV
2006/0055564 A1 3/2006 Olsen et al.
2006/0152349 A1 7/2006 Ratnakar
2006/0170566 A1 * 8/2006 Slemmer et al. ........... 340/932.2
2006/0180647 A1 8/2006 Hansen
2006/0219776 A1 10/2006 Finn
2006/0255119 A1 * 11/2006 Marchasin et al. ........... 235/375
2007/0112620 A1 * 5/2007 Johnson et al. ................. 705/13
2007/0136140 A1 6/2007 Smith, Jr.

* cited by examiner

*Primary Examiner* — Ahshik Kim

(74) *Attorney, Agent, or Firm* — Brooks Kushman P.C.

(57) ABSTRACT

A system for monitoring the parking status of vehicles incorporating a plurality of wireless identification tags, each tag having a unique tag identifier and having association with a selected vehicle. The system also includes a portable scanner to be used by a parking monitor, the portable scanner having a processor executing instructions thereon, a tag scanner capable of reading a wireless identification tag of a selected vehicle located in relatively close proximity over a wireless link, and a communication device capable of communicating over a wireless wide area network to transmit information about vehicle parking status. A server, having a database with fields for each of the selected vehicles, communicates with the portable scanner over the wireless wide area network to log data related to vehicle parking status. A software program may also be used to facilitate communication between the scanner and the vehicle owner and/or between the scanner and a tow service.

14 Claims, 10 Drawing Sheets

RFID PARKING TAG AND METHOD OF MONITORING VEHICLE PARKING

BACKGROUND OF THE INVENTION

1. Field of the Invention

The present invention relates to systems for monitoring vehicle parking, and more particularly to systems that monitor vehicle parking using a plurality of wireless RFID tags and barcode.

2. Background Art

Parking enforcement is common in a variety of settings, including parking lots, street parking, and parking structures. Such enforcement may include absolute enforcement, for areas in which no parking is permitted, or the rules may call for conditional enforcement, which includes permit-only parking or meter parking.

One way in which institutions attempt to enforce parking is by provide parking tags for placement within the interior of a vehicle as a means of identifying a car during conditional enforcement. Typically, a parking attendant must visually inspect a vehicle for the presence of the tag and, in the case of an infraction, the attendant is tasked with having to manually issue a citation. Monitoring parking in this fashion is time consuming and costly, particularly in large spaces such as multi-level buildings and city blocks. Furthermore, bad weather, such as a heavy falling of snow, can preclude a parking monitor from visually verifying the tag in an outdoor parking area.

While parking monitoring systems have been described, they are typically limited to the absolute detection of a vehicle in a parking spot. These systems are often used in parking garages or other structures to determine vacancy or to collect statistics. As a significant disadvantage, these parking systems do not apply parking restrictions to determine whether a vehicle is parked in a spot where it should not be. As a further disadvantage, a parking monitor may be tasked with manually gathering information about a vehicle to report to a towing service, and may also, or instead be required to mark the car for a tow truck to identify.

Accordingly, there remains a need for an automated parking enforcement system that can save time and cost in a number of parking environments.

SUMMARY OF THE INVENTION

The present invention contemplates a system for monitoring the parking status of vehicles in which the system includes a plurality of wireless identification tags, wherein each tag has a unique tag identifier and associates with a selected vehicle. The system further includes a portable scanner to be used by a parking monitor, wherein the portable scanner includes a processor executing instructions thereon, a tag scanner capable of reading a wireless identification tag of a selected vehicle located in relatively close proximity over a wireless link, and a communication device capable of communicating over a wireless wide area network to transmit information about vehicle parking status. A server having a database with fields for each of the selected vehicles communicates with the portable scanner over the wireless wide area network to log data related to vehicle parking status.

In an embodiment of the invention, the parking monitoring system further includes a software program in communication with the portable scanner via a wide-area network. The program can communicate with a database to retrieve information related to a vehicle to send a ticket to the vehicle owner. The system may also include a printer in communication with the portable scanner to print a parking ticket as an alternate, or in addition, to the communication with the vehicle owner via the software program.

In another embodiment of the invention, the portable scanner of the parking monitoring system includes a GPS receiver for obtaining the location of the target vehicle. The system further includes a software program in communication with the portable scanner via a wide-area network. The program can communicate with a database to retrieve information related to a vehicle and communicate the information, along with the location of the vehicle, to a tow service.

In a further embodiment of the invention, the wireless access point is associated with the parking attendant's vehicle, thereby providing a portable wireless access point. The communication device of the portable scanner communicates with the database and/or software program over the wide area network via the wireless access point.

In yet another embodiment of the invention, the wireless access point is associated with the portable scanner, thereby providing a portable wireless access point irrespective of the parking attendant's vehicle. The communication device of the portable scanner communicates with the database and/or software program over the wide area network via the wireless access point.

In another embodiment of the invention, the wireless access point is associated with a computer or similar device, thereby providing a portable wireless access point irrespective of the parking attendant's vehicle and the portable scanner. The communication device of the portable scanner communicates with the database and/or software program over the wide area network via the wireless access point.

DETAILED DESCRIPTION OF THE PREFERRED EMBODIMENT(S)

Figure 1:
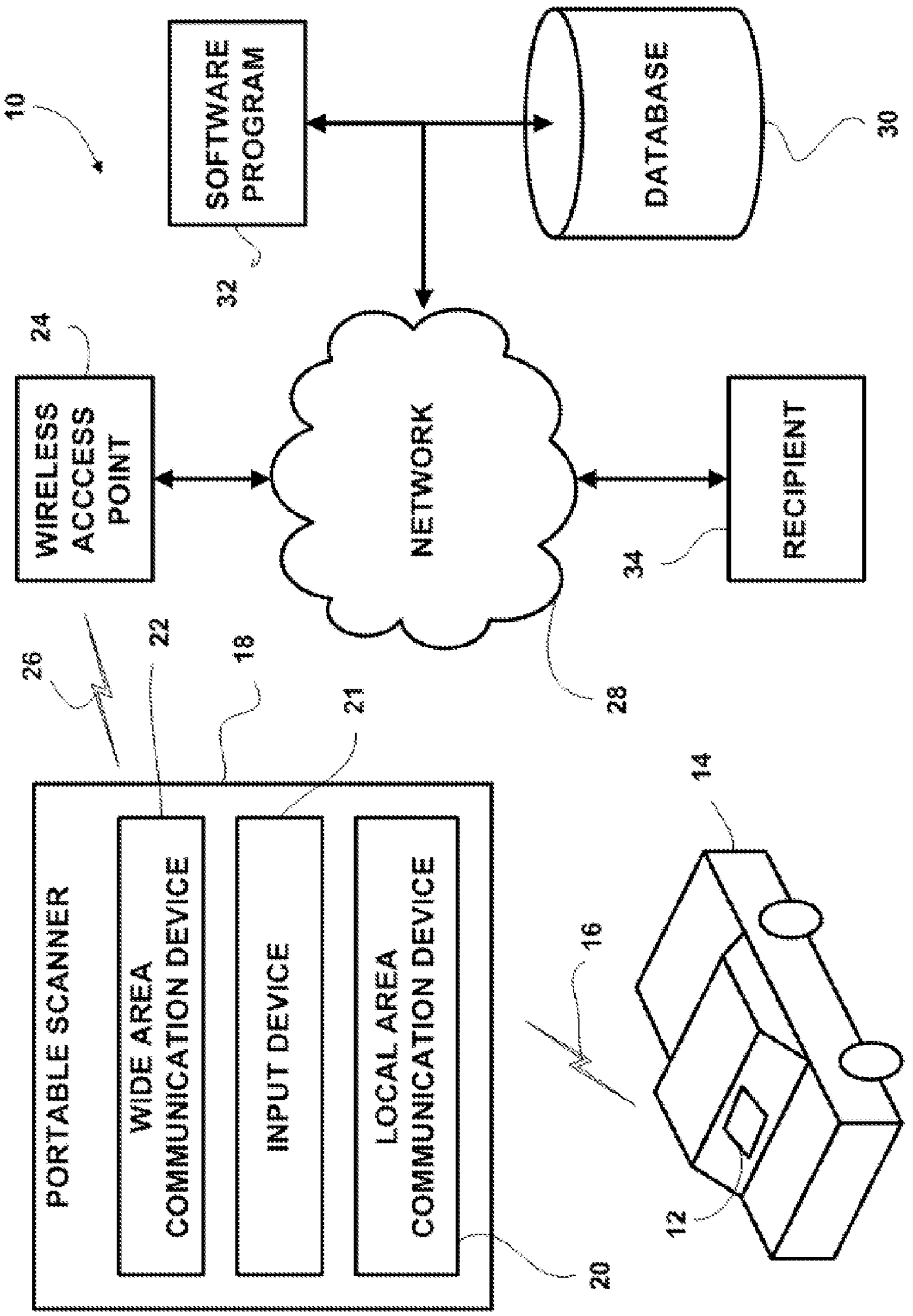
FIG. 1 shows a general overview of a system for monitoring the parking status of vehicles in accordance with embodiments of the present invention.

FIG. 1 illustrates a general system 10 in which methods consistent with embodiments of the present invention may be implemented. The system includes a wireless identification tag 12 associated with a selected vehicle 14, wherein the tag 12 has a unique identifier and information associated with the vehicle 14, and is capable of communicating the information via a first wireless communication link 16. Although a single vehicle is shown for diagrammatic simplicity, the system 10 of the present invention is well-suited for environments containing several vehicles, such as a parking lot. Furthermore, as the invention contemplates communicating with the tag 12 within a radio-frequency range, the identification tag 12 is hereforth referred to as "tag", "radio frequency identification tag", or "RFID tag". It should be understood, however, that the communication 16 need not be limited to the radio-frequency range and may operate in any suitable range of frequencies as one skilled in the art will recognize.

Still referring to FIG. 1, the system 10 further includes a portable scanner 18 for communicating with the RFID tag 12 via a local communication device 20 over the first communication link 16. Scanner 18 is preferably a small, handheld device which can be easily carried by a parking control agent (hereforth "operator" or "parking attendant"). The local area communication device 20 allows the operator of the portable scanner 18 to quickly obtain vehicle information stored in the RFID tag 12. The tag 12, and the information stored therein, is further discussed in FIG. 2. The communication device 20 can include any suitable antenna that operates in any mode; such as uni-directional mode, bidirectional mode, omnidirectional mode, or the like; as dictated by the particular application. In general, the antenna (not shown) of the communication device 20 can be any transducer capable of converting wireless signals into electrical signals and vice versa. Examples of such transducers include radio frequency antennas, electrical-optical converters, and acoustic devices.

The scanner 18 further includes an input device 21, such as a keyboard, touchpad, or any similar device, that allows a user to input information relating to the vehicle that may not otherwise be stored on the RFID tag 12. The scanner 18 also includes a second communication device 22 having an antenna (not shown) for communicating with a wireless access point 24, as shown by communication element 26. Although the invention contemplates communication device 22 having an antenna operating in the radio-frequency range, the antenna can be any transducer capable of converting wireless signals into electrical signals.

The access point 24 connects to a wide-area network 28, such as the internet, thus allowing the portable scanner 18 to transmit vehicle information from the RFID tag 12 to a database 30. A software program 32 may also communicate with the database 30 to transmit vehicle information stored in the database 30 to one or more recipients 34, as will be further discussed in the following embodiments of the invention. The program 32 can operate on a common server with the database 30 or can alternatively operate on the scanner 18 and access the database 30 remotely via the network 28.

Figure 2:
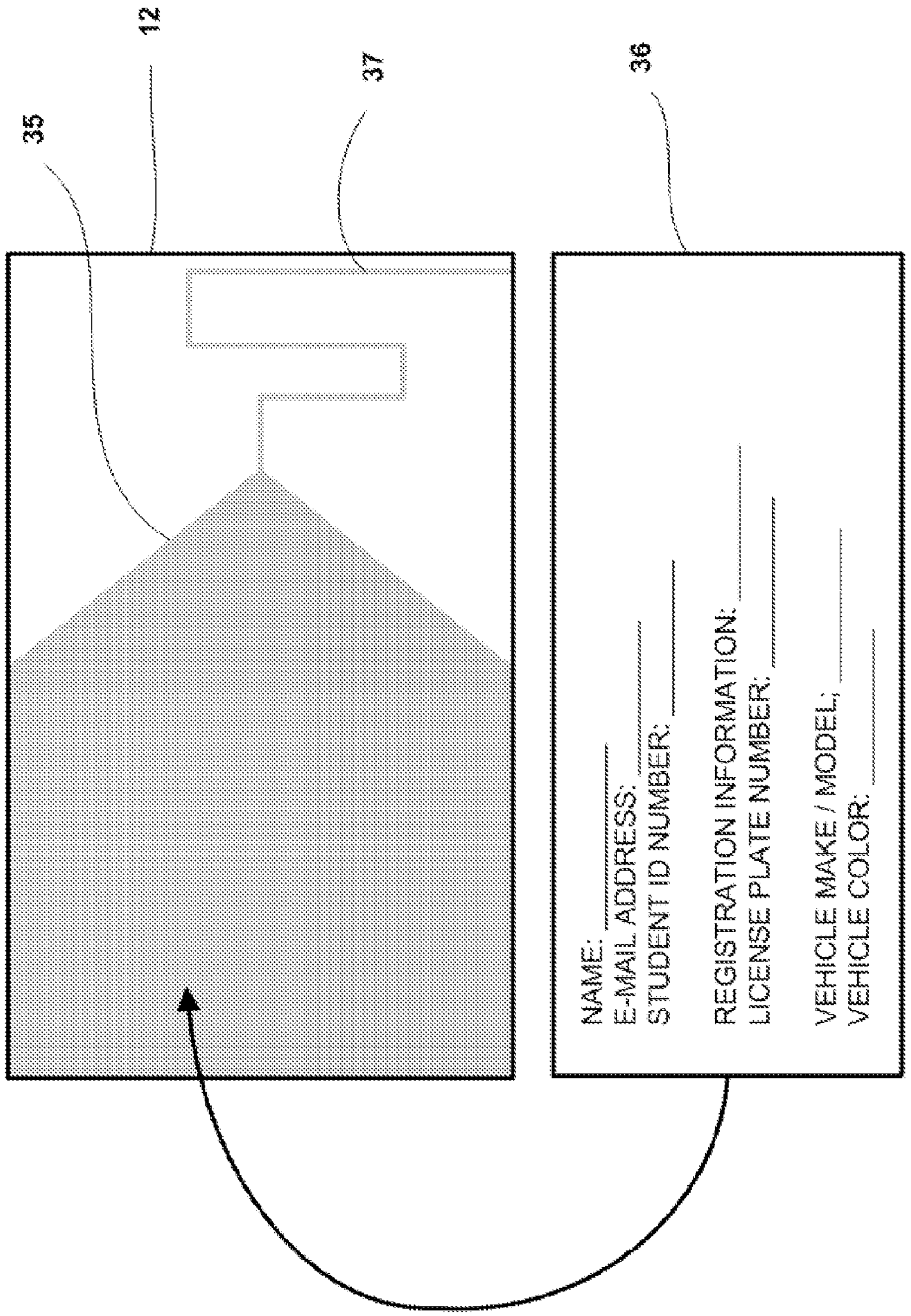
FIG. 2 illustrates an RFID tag used in accordance with embodiments of the present invention.

FIG. 2 shows an illustration of an RFID tag 12 used in accordance with the system 10 of the present invention. The tag 12 associates with a vehicle 14, as shown in FIG. 1, and is exemplarily located within the vehicle compartment. The tag contains a media portion 35 used to store information relating to the vehicle, and an antenna element 37 for wirelessly receiving and transmitting signals. Element 36 represents an exemplary list of information that may be stored in the RFID tag 12. The tag 12 may contain information relating to the vehicle, for example the registration and the license plate number, and/or information relating to the vehicle owner, such as the owner's name, address, e-mail address, student ID number, and the like. These fields are not meant to exhaustively list the various types of information but rather serve to show the different types of information that can be stored on the RFID tag 12.

Figure 3:
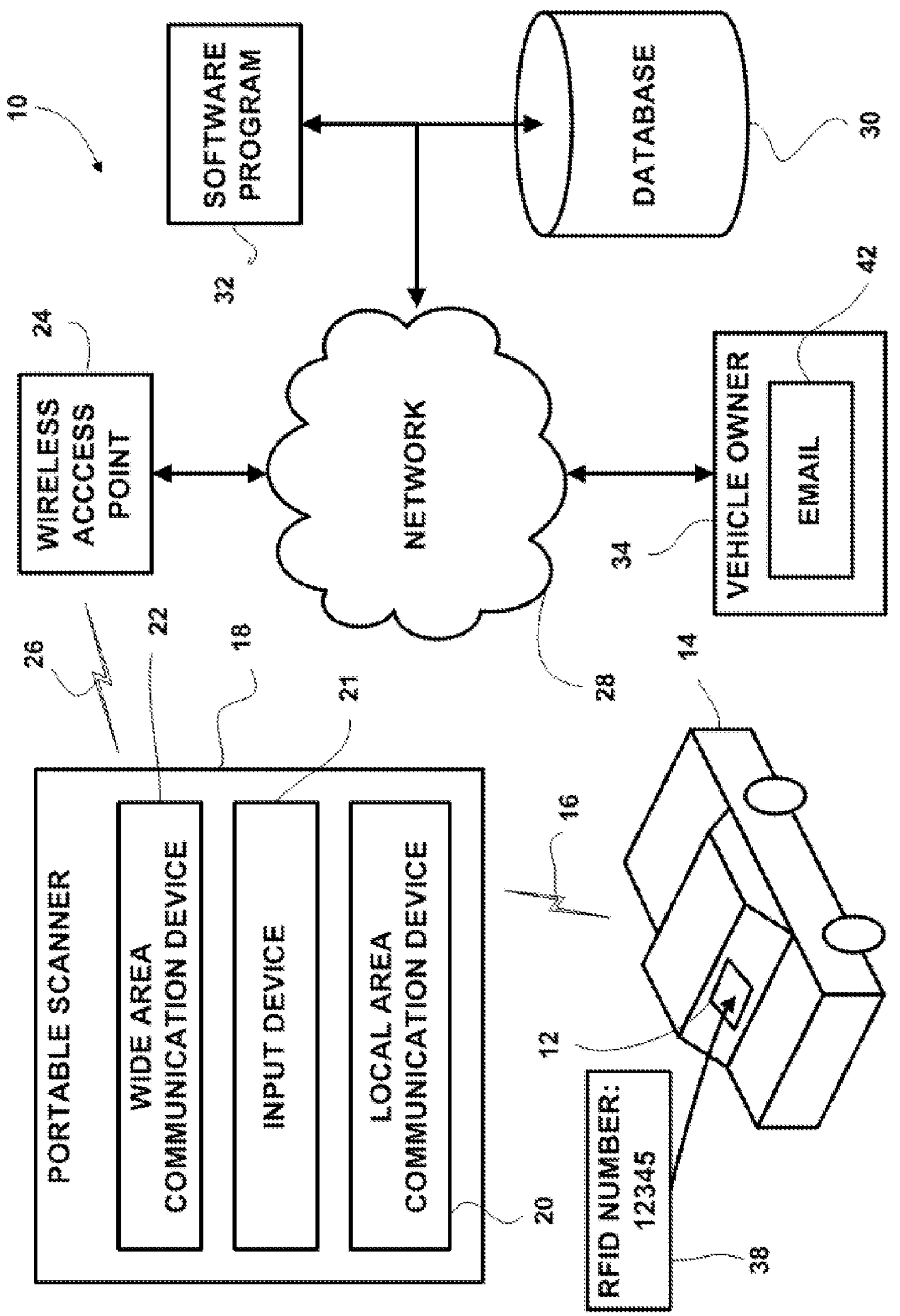
FIG. 3 shows an embodiment of the present invention wherein a software program facilitates communication with an vehicle owner.

FIG. 3 illustrates an embodiment of the present invention, wherein a software program 32 facilitates parking enforcement between an operator of the portable scanner 18 and the owner of the vehicle 14. As shown by element 38, the RFID tag 12 contains an "RFID number" field having an arbitrarily chosen number. In a similar fashion to the system 10 shown in FIG. 1, a user of the portable scanner 18 can communicate with the RFID tag 12 via the local communication device 20 of the scanner 18 over communication link 16. Assume, for the sake of example, that the vehicle 14 corresponding to the RFID tag 12 is in violation of a rule and that the user of the scanner, a parking attendant for example, wishes to issue a ticket to the owner of the vehicle via e-mail. The attendant can use the portable scanner 18 to communicate with the RFID tag 12 to obtain the RFID number encoded therewithin. The scanner 18 can then be used to access a software program 32 through a wide-area network 28, such as the internet, via a wireless access point 24.

The program 32 shown in FIG. 3 may facilitate communication between the scanner 18 and the database 30. For example, the parking attendant could send a request to the program 32 via the portable scanner 18 to query the database 30 for an RFID number. Upon retrieval of the query, the program 32 would automatically send an e-mail 42 to the vehicle owner with a reference to an online parking ticket, via a link for example, wherein the owner could access the parking ticket and pay the appropriate fines associated with the ticket. While the preceding example relates to communication between the program 32 and the vehicle owner via an e-mail 42, any suitable method of communication may be implemented, such as Short Messaging Service (SMS), Voice-Over Internet Protocol (VOIP), or the like, as dictated by the particular situation.

Figure 4A:
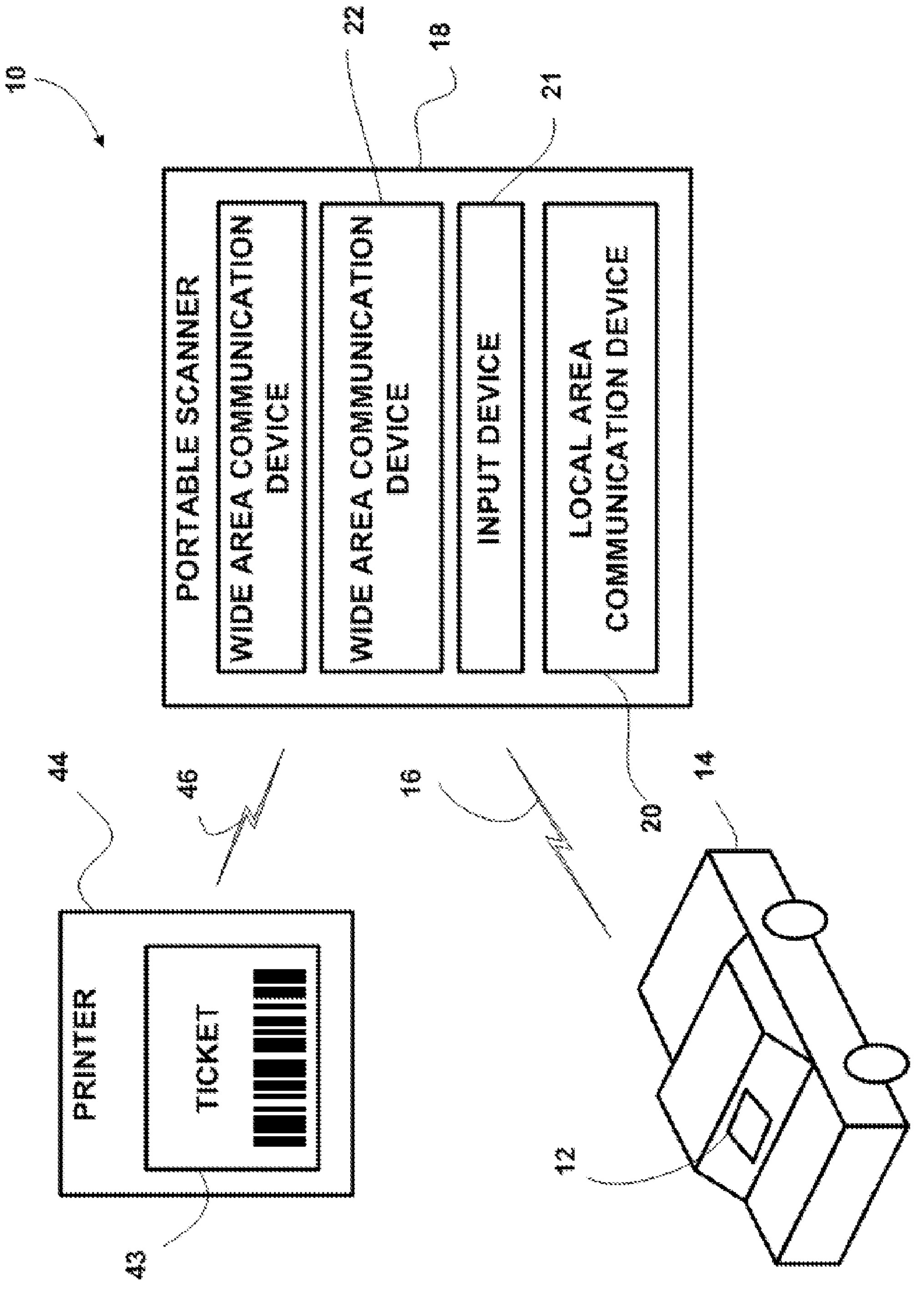
FIG. 4A shows an aspect of embodiments of the present invention, wherein a portable scanner can print tickets via a printer.

FIG. 4A shows an alternate method of ticket issuance in the scenario that the database 30 does not contain sufficient information to communicate with the vehicle owner. The system 10 includes a printer 44 in communication with the portable scanner 18, as illustrated by communication link 46. Although the present invention contemplates using a handheld printer for ease of transportation, the printer 44 can be any type of printer as dictated by the particular situation. The printer 44 can connect to the portable scanner 18 via a wireless connection and/or via a cable. Referring briefly to FIG. 3, if, for example, the database 30 does not contain an "e-mail field" for the vehicle owner 34, the program 32 can communicate with the scanner 18 via the network 28 to notify the parking attendant that a ticket cannot be automatically issued via e-mail.

As shown by the system 10 in FIG. 4A, the attendant can print a ticket 43 with the printer 44 and issue the ticket 43 to the vehicle owner in any conventional way, such as by postal mail or by placing the ticket on the windshield of the vehicle 14. Furthermore, the printer 44 could optionally print a barcode 45 on the ticket with information relating to the vehicle, such as the vehicle's license plate number, make, model, or the like. The barcode could also contain a single field, being a unique number corresponding to the ticket. In the latter case, the attendant would upload the unique number corresponding to the ticket, along with information relating to the vehicle, to the database 30 via the wide area network 28.

Figure 4B:
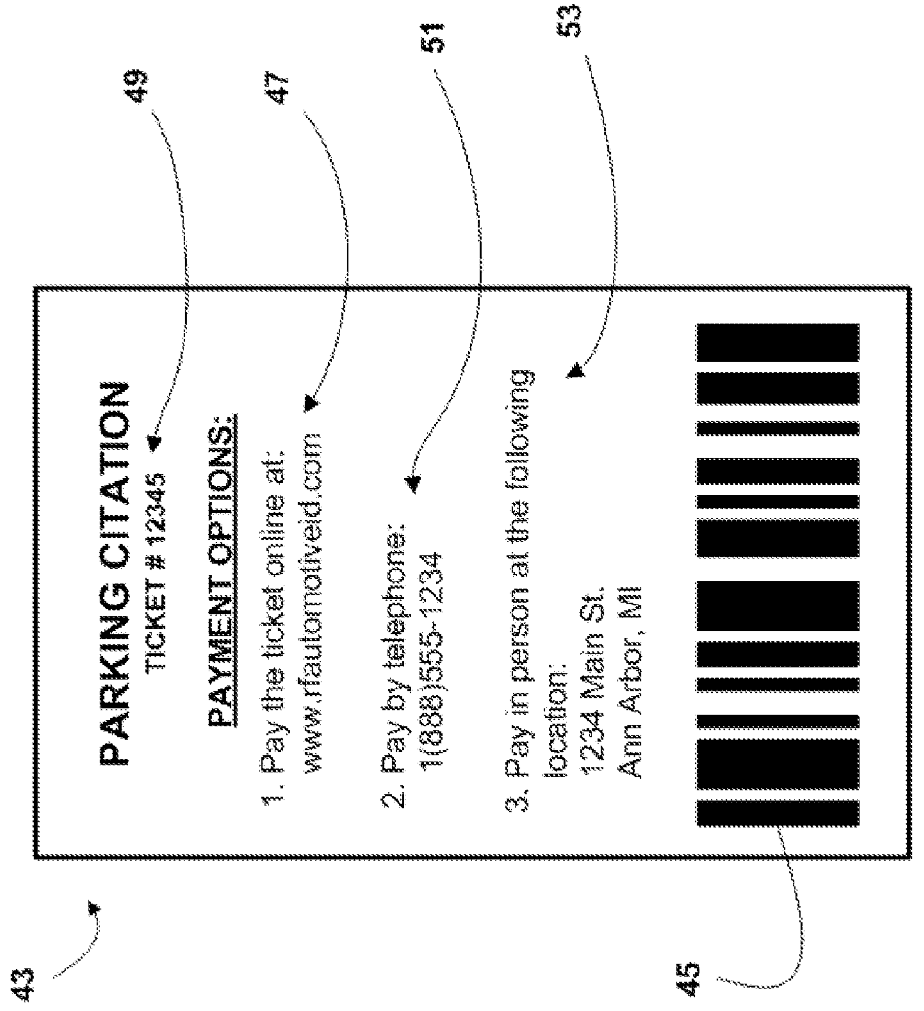
FIG. 4B shows a parking ticket in accordance with embodiments of the present invention.

FIG. 4B shows a parking ticket in accordance with embodiments of the present invention. The ticket 43 provides several payment options to the recipient of the ticket. As shown by element 47, the recipient could pay via a website over the internet by inputting the ticket number 49 into a designated field of the website. The website could then cross-reference the ticket number entered by the ticket recipient with the corresponding information in the database 30 to retrieve information relating to the payment (e.g. the cost of the ticket). Conventionally, several methods of payment are available over the internet including: payment via credit card; direct banking account transfer; payment via a third-party service, such as PayPal; or the like. The website would allow the ticket recipient to pay the ticket using one or more of the aforementioned methods, or via any other method recognized by one skilled in the art. The ticket recipient could also pay the ticket via telephone 51 via similar payment methods. As shown by element 49, a ticket recipient could pay the ticket in person at a designated location. Although the designated location could be serviced by individuals, embodiments of the present invention contemplate automatically transacting the ticket via a designated payment station, as further described and shown in FIG. 4C.

Figure 4C:
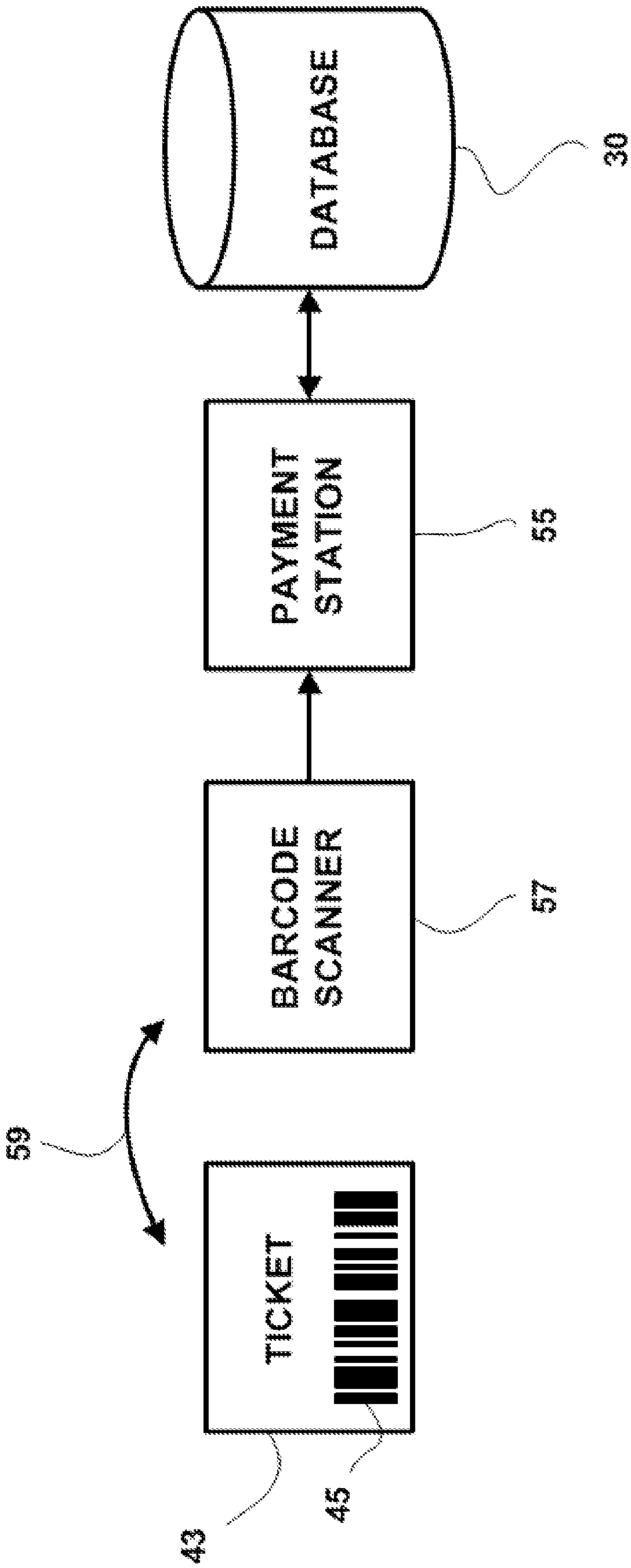
FIG. 4C shows a system of ticket payment in accordance with embodiments of the present invention.

FIG. 4C shows a system of ticket payment in accordance with embodiments of the present invention that provides a convenient means for a ticket recipient to pay the fines associated with a ticket in person. As described above, the ticket provides one or more locations for a ticket recipient to pay a ticket in person. At such a location, a pre-configured payment station 55, in communication with the previously described database 30 and having an associated barcode scanner 57, would be readily available for the ticket recipient. Although a number of configurations could be used for the payment station, embodiments of the present invention contemplate having a "kiosk" station with one or more input-output devices (e.g. a monitor display) and one or more devices capable of accepting currency (e.g. a credit card reader).

Still referring to FIG. 4C, the barcode 45 on the ticket 43 could be encoded with a unique ticket number. The ticket recipient could scan the barcode 45 using the barcode scanner 57, as shown by element 59, thereby providing the payment station with the unique ticket number. The payment station 55 would then query the database 30 for information associated with the ticket number (e.g. amount of the ticket) and output the information to the display of the payment station 55. The ticket recipient could then pay the appropriate fine using any suitable method, as dictated by the particular configuration of the payment station and/or the preference of the ticket recipient.

Figure 5:
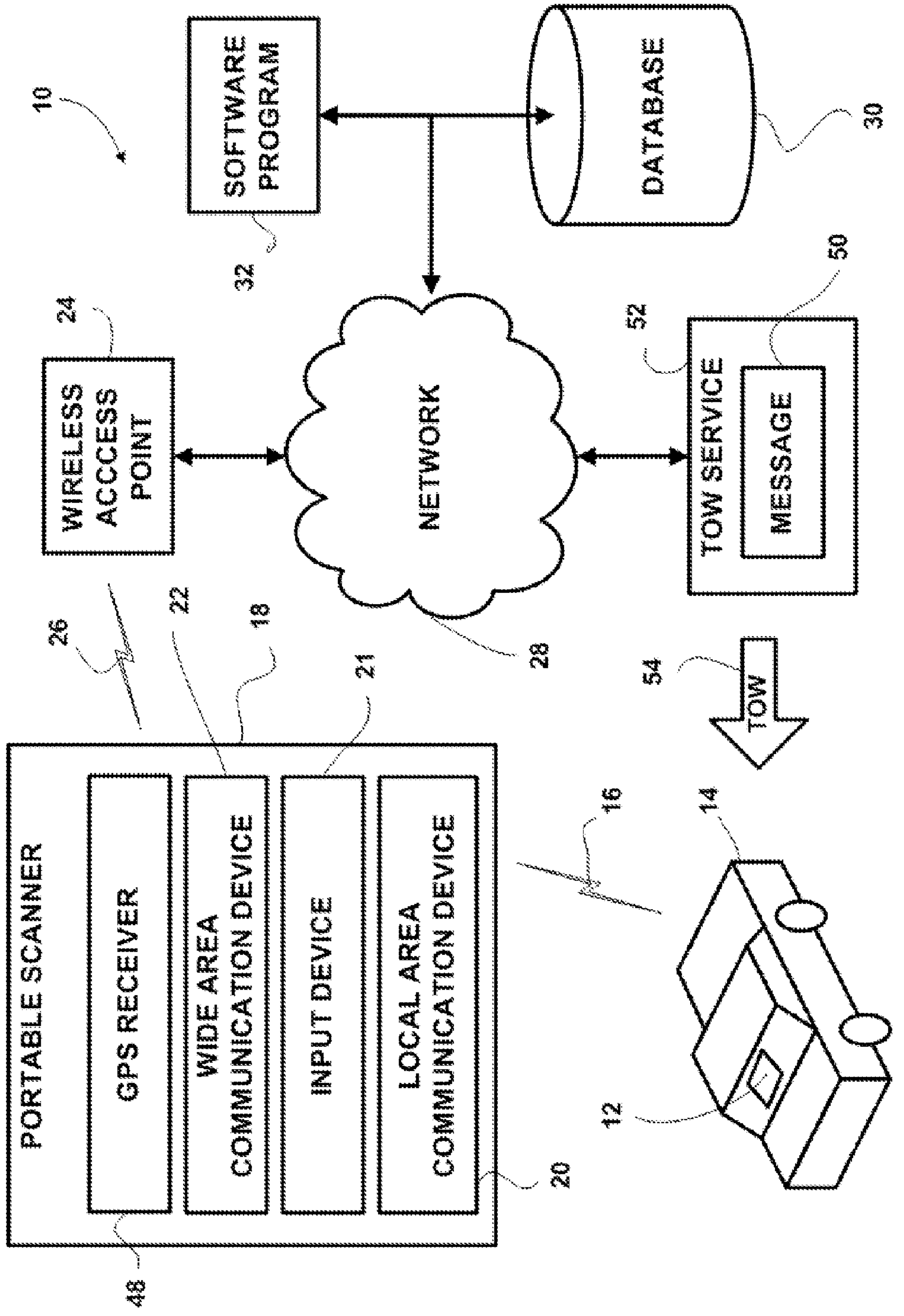
FIG. 5 shows an embodiment of the present invention wherein a software program facilitates communication with a tow service.

FIG. 5 illustrates an embodiment of the invention, wherein the system 10 relates to automatically requesting for the towing of a vehicle 14 via a portable scanner 18. The scanner 18 includes a GPS receiver 48 for obtaining the GPS location of the scanner 18. GPS receivers are well known in the art and used in a variety of applications for receiving or sending positional coordinates. As an example, assume that a parking lot attendant wishes to issue a tow request for the vehicle 14 shown in FIG. 3. The attendant can manually input identifying information relating to the vehicle 14, such as a license plate number, or alternatively obtain identifying information from the RFID tag 12, if the information exists there within.

Using the portable scanner 18, the attendant could then transmit the information along with the GPS location of the vehicle 18 across a network 28, such as the internet, to a software program 32 via a wireless access point 24. The program 32 would then access a database 30 to determine which tow service services the GPS location and send a text message 50 to the appropriate tow service 52. The program 32 could also communicate with the tow service 52 using any other suitable method, including e-mail, automated phone messaging, or the like. The tow service would then dispatch a driver to the GPS location to tow the vehicle 14, as represented by element 54.

Figure 6A:
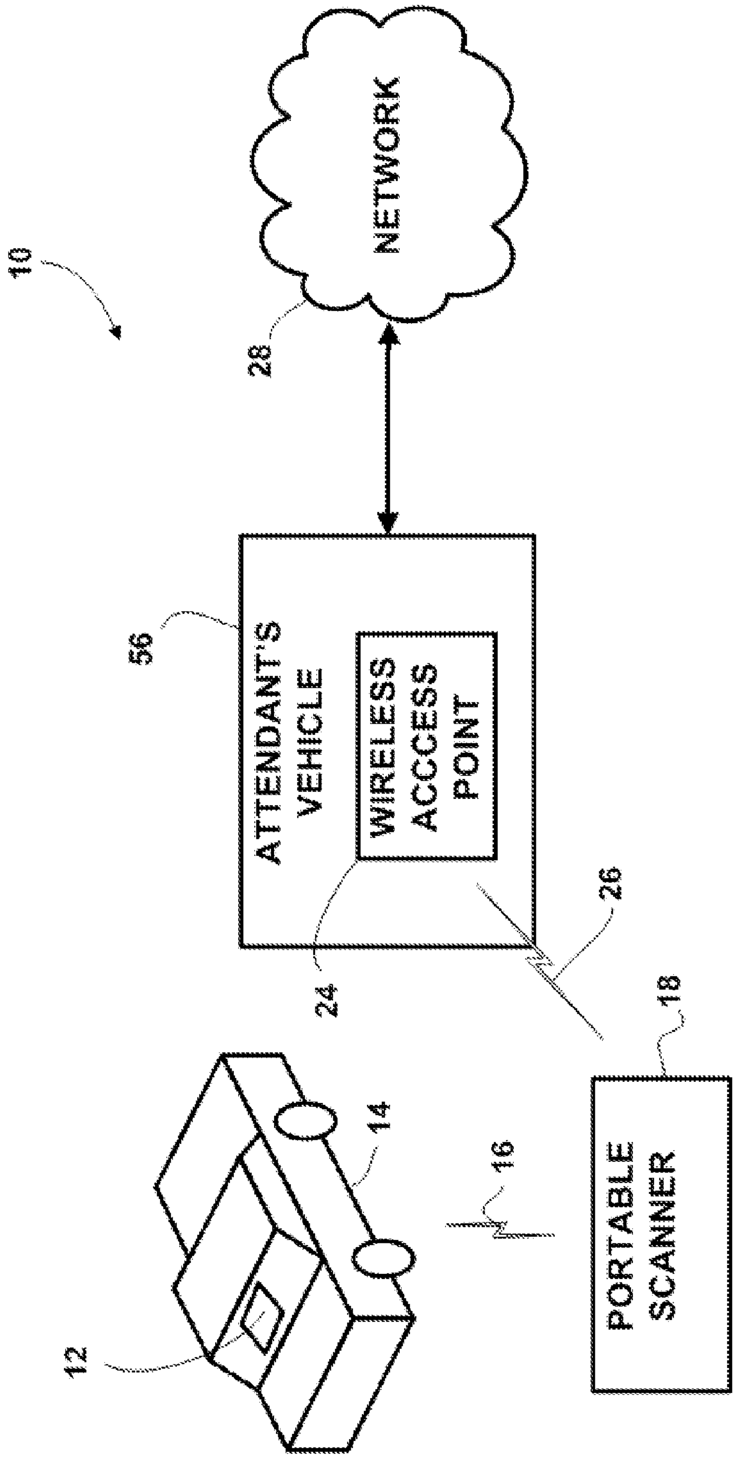
FIG. 6A shows an embodiment of the present invention wherein a wireless access point is associated with a parking attendant's vehicle.
Figure 6B:
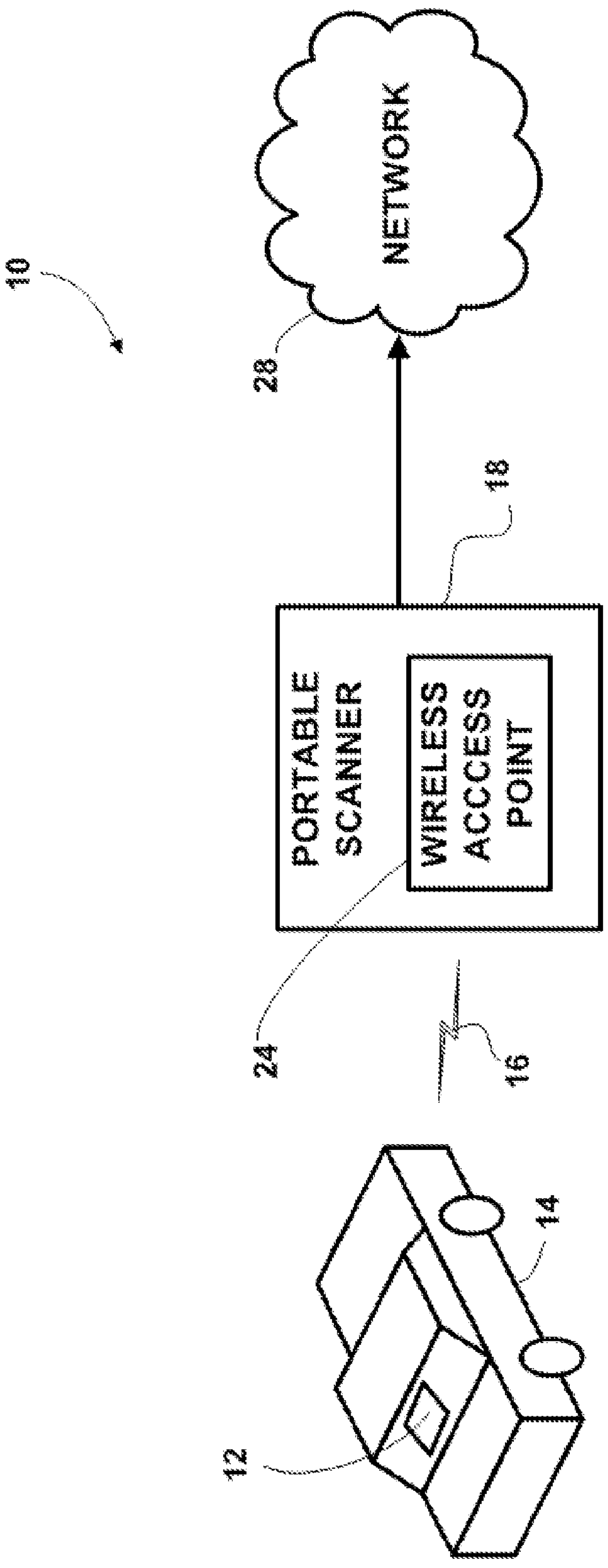
FIG. 6B shows an embodiment of the present invention wherein a wireless access point is associated with a portable scanner.
Figure 6C:
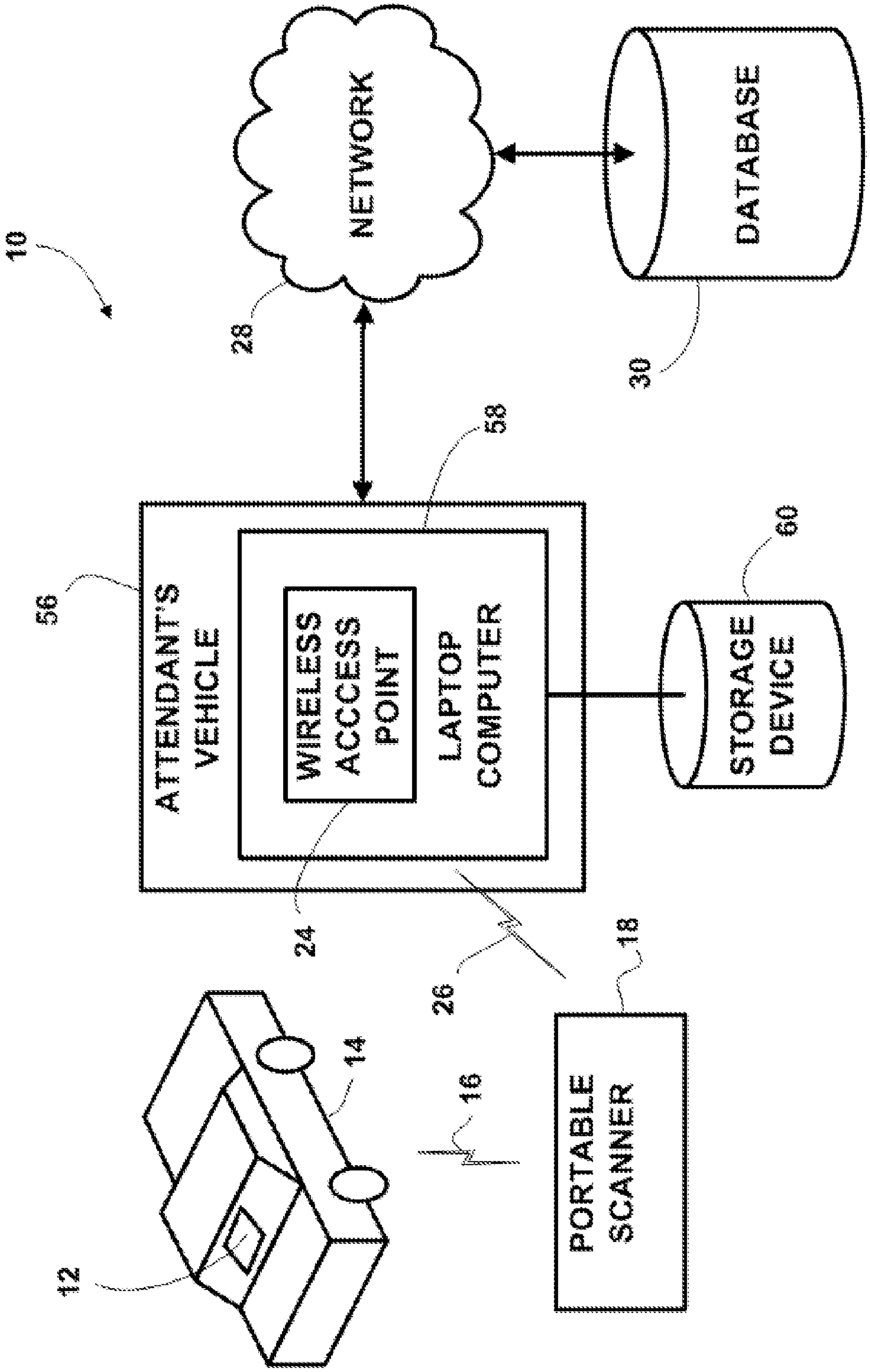
FIG. 6C shows an embodiment of the present invention wherein a wireless access point is associated with a computer or similar device.

FIGS. 6A-6C illustrate embodiments of the invention, wherein the wireless access point (WAP) 24 is associated with a parking attendant's vehicle 56 and/or a portable scanner 18, thereby providing the attendant with a portable access point to the wide-area network 28. Such embodiments would significantly reduce infrastructural costs by obviating the need for equipment associated with a fixed wireless access point in areas where such equipment would not otherwise be readily available. Furthermore, the systems 10 of FIGS. 6A-6C would allow an attendant to monitor parking, in accordance with embodiments of the invention, in areas that would otherwise locate at a distance inaccessible to a fixed wireless access point assuming that the wireless access point provider services said areas.

As shown in FIG. 6A, the wireless access point 18 is associated with the attendant's vehicle 56. Such an association could be realized in a number of ways. For example, the vehicle 56 could be configured with a WAP 24 or, alternatively, separate hardware (not shown) could interface with the hardware in the vehicle 56 (also not shown) to create a WAP. As an example of the latter scenario, the vehicle 56 could include a microprocessor in communication with a Universal Serial Bus (USB) port. Such microprocessors equipped with USB ports are commonly used in vehicles for providing a convenient "plug and play" interface between the microprocessor and an auxiliary device. Likewise, a number of devices; such as Peripheral Component Interconnect (PCI), Small Computer System Interface (SCSI), or the like; may be used to facilitate communication between the microprocessor and a peripheral device. In the present system 10, a USB wireless access device could interface with the USB port to provide the attendant with a wireless access point. USB wireless access devices are well known in the art and are disclosed herein by reference. In the system 10 of FIG. 6A, the portable scanner 18 would communicate with the WAP 24 in a fashion similar to that of the previously described embodiments.

FIG. 6B shows an alternate embodiment, wherein the wireless access point 24 is located in the portable scanner 18. In the system 10 of FIG. 6B, an attendant could be traveling on a vehicle incapable of hosting a wireless access point, such as a bicycle. By associating the WAP 24 with the scanner 18 rather than the attendant's vehicle 56, the scanner could be used irrespective of a particular vehicle. As with the system 10 of FIG. 6A, the WAP 24 could be realized in a number of ways. Exemplarily, the portable scanner 18 would include a microprocessor capable of interfacing with a peripheral wireless device, such as a USB wireless access device or a PCI wireless card.

FIG. 6C shows another embodiment, wherein the wireless access point 24 is located in a portable computer. For convenience, the computer is shown as a laptop device 58, although any other type of computer could just as easily be substituted. The laptop 58 associates with a storage device 60, such as a hard disk drive, a flash drive, or the like. The storage device 60 provides the attendant with a convenient means for storing data relating to a select group of vehicles. For example, the attendant could survey a parking lot, saving the unique RFID tag 12 identifier from several vehicles to the storage device, and then cross-reference each identifier with the corresponding identifier in the database 30, rather than having to cross-reference each identifier individually. Alternatively, part or all of the information in the database 30 could be stored on the storage device 60 to obviate the need for accessing the database 30 over the wide area network 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for monitoring the parking status of vehicles, the system comprising:

a plurality of wireless identification tags, each tag having a unique tag identifier, wherein each of the tags is associated with a selected vehicle;

a portable handheld scanner to be used by a parking monitor, the portable scanner having a processor executing instructions thereon, the portable handheld scanner having a first communication device capable of reading a wireless identification tag of a selected vehicle located in relatively close proximity over a wireless link, the portable handheld scanner having a second communication device capable of communicating remotely over a wireless local area network:

a portable wireless access point providing a third communications device in communication with the handheld scanner to transmit information about vehicle parking status over a wireless wide area network in real time; and a server having a database with fields for each of the selected vehicles including the tag identifier, vehicle information and vehicle owner, wherein the server communicates with the portable handheld scanner over the wireless wide area network to communicate data related to vehicle parking status.

2. The system of claim 1 wherein the wireless access point communicates with a server device, and the said server device is in communication with at least one storage medium.

3. The system of claim 2 wherein the at least one storage medium has at least one of the fields from the database encoded thereon.

4. The system of claim 1 wherein the plurality of wireless identification tags are RFID tags.

5. The system of claim 1 wherein the plurality of wireless identification tags are passive RFID tags.

6. The system of claim 5 wherein the first communication device is a passive RFID tag reader.

7. The system of claim 5 wherein the first communication device is a barcode scanner.

8. The system of claim 1 wherein the server is provided with a mail program capable of automatically formulating and sending a e-mail message to a vehicle owner over a network connection related to vehicle parking status.

9. The system of claim 1 wherein the portable handheld scanner is further provided with a GPS sensor for transmitting the location of a vehicle.

10. The system of claim 1 wherein the portable handheld scanner is further provided with a graphical user interface and an input device enabling the parking monitor to input and display information about a vehicle associated with a scanned tag.

11. The system of claim 10 wherein the portable handheld scanner is further provided with a vehicle tag database storing tag identifiers and at least limited vehicle information which can be displayed to the parking monitor on the graphical user interface.

12. The system of claim 1 further comprising a portable ticket printer communicating with the portable handheld scanner.

13. The system of claim 12 wherein the portable ticket printer communicates with the portable handheld scanner via a low power local wireless connection.

14. The system of claim 12 wherein the portable ticket printer communicates with the portable handheld scanner via a physical cable connection.

* * * * *